United States Patent [19]

Hradek

[11] Patent Number: 4,496,376
[45] Date of Patent: Jan. 29, 1985

[54] VARIABLE AREA MOLECULAR SIEVE CONTAINER HAVING A THERMAL CONTROL SYSTEM

[75] Inventor: Richard W. Hradek, Davenport, Iowa

[73] Assignee: Litton Systems, Inc., Davenport, Iowa

[21] Appl. No.: 317,101

[22] Filed: Nov. 2, 1981

Related U.S. Application Data

[62] Division of Ser. No. 872,694, Jan. 26, 1978, abandoned.

[51] Int. Cl.³ .............................................. B01D 53/04
[52] U.S. Cl. ....................................... 55/163; 55/179; 55/208; 55/389
[58] Field of Search .................... 55/20, 62, 68, 74, 75, 55/163, 179, 208, 387, 389, 419, 483, 509, 518, 316, 162

[56] References Cited

U.S. PATENT DOCUMENTS

| | | | |
|---|---|---|---|
| 1,963,874 | 6/1934 | Stampe | 55/316 |
| 2,561,441 | 7/1951 | Lou | 55/163 |
| 2,790,512 | 4/1957 | Dow | 55/74 X |
| 2,944,627 | 7/1960 | Skarstrom | 55/75 X |
| 3,069,830 | 12/1962 | Skarstrom et al. | 55/75 X |
| 3,142,547 | 7/1964 | Marsh et al. | 55/62 X |
| 3,171,726 | 3/1965 | Roney et al. | 55/387 X |
| 3,186,150 | 6/1965 | Zankey | 55/179 X |
| 3,222,849 | 12/1965 | Fischer | 55/163 |
| 3,280,536 | 10/1966 | Berlin | 55/75 X |
| 3,313,091 | 4/1967 | Berlin | 55/75 X |
| 3,507,097 | 4/1970 | Crowley et al. | 55/162 |
| 3,615,233 | 10/1971 | Doering et al. | 55/518 X |
| 3,619,130 | 11/1971 | Ventriglio et al. | 55/75 X |
| 3,948,286 | 4/1976 | Dunbar et al. | 137/609 |
| 4,042,349 | 8/1977 | Baudouin et al. | 55/75 X |

Primary Examiner—Robert H. Spitzer
Attorney, Agent, or Firm—Brian L. Ribando

[57] ABSTRACT

A fluid separator apparatus having a control member for allowing a source of pressurized fluid mixture to flow in a first direction through a bed of adsorption material to produce a product fluid and for allowing a purge fluid to regenerate the bed of adsorption material by flowing in a second direction substantially opposite to the flow of the fluid mixture. The bed of adsorption material has a variable cross-sectional area corresponding to a substantially uniform and optimum rate of adsorption of an element in the fluid mixture by the individual particles of adsorption material. A shroud which surrounds the bed of adsorption material directs the purge fluid over the bed of adsorption material to retain any heat generated during adsorption within the bed of adsorption material. A sensor located within the shroud operates a heater to maintain the temperatures of the fluid mixture and the adsorption beds within a predetermined temperature range to assure that the optimum rate of adsorption by the particles is not changed by temperature variations in the supply of pressurized fluid mixture and in the ambient environment.

9 Claims, 5 Drawing Figures 4,496,376

VARIABLE AREA MOLECULAR SIEVE CONTAINER HAVING A THERMAL CONTROL SYSTEM

This is a division of application Ser. No. 872,694, filed Jan. 26, 1978, now abandoned.

BACKGROUND OF THE INVENTION

It has been found that pressurized air can be fractionalized by removing various elements therefrom through the use of molecular sieves. Molecular sieve separators such as disclosed in U.S. Pat. Nos. 2,944,627, 3,280,536 and 3,142,547 disclose the use of molecular sieve materials having an Angstrom pore size of approximately 5 and which are capable of producing an oxygen enriched product fluid from pressurized air. In such separators it is the usual practice to employ several beds of molecular sieve material. While one bed is being desorbed another bed, through the operation of control valves, is sequentially presented with a source of pressurized air to establish a continuous supply of the oxygen enriched product fluid.

In beds of adsorption material disclosed in the prior art which have substantially the same cylindrical configuration, it has been found that the particles of adsorption material closest to the entrance port through which pressurized air is presented, adsorb the majority of nitrogen in the production of the oxygen enriched product fluid. Thus, the particles of adsorption material adjacent the exit port are not effectively utilized in the production of the oxygen enriched product fluid.

In addition, it was discovered that the efficiency of such molecular sieve separators is also dependent upon temperature. From experimentation it has been determined that the most effective of separation occurs when both the pressurized air and beds of adsorption material are maintained at a temperature of about 80° F. Unfortunately, when molecular sieve separators are used in aircraft the temperature in unpressurized aircraft cabins can reach $-65°$ F. at altitudes approaching 30,000 feet. Under these conditions, thereafter the efficiency of such prior art molecular separators is greatly reduced and the production of the oxygen enriched product fluid in such aircraft is essentially eliminated at an altitude when a pilot needs oxygen the most.

SUMMARY OF THE INVENTION

I have devised a molecular sieve separator system for use in aircraft having a substantially uniform amount of adsorption of an element per unit of fluid flow of a fluid mixture by each particle in a bed of adsorption material over the entire altitude operating range of an aircraft.

This molecular sieve separator system has first and second containers for retaining beds of adsorption materials. The first and second containers are sequentially presented with a pressurized fluid mixture that has been heated to a predetermined temperature. Each of the first and second containers has an entrance flow distribution chamber which directs the pressurized air into a large diameter section of a material retention chamber. The cross-sectional area of the material retention chamber varies from the large diameter section at the entrance flow distribution chamber to a smaller diameter section adjacent an exit flow distribution chamber. The pressurized fluid mixture, after being presented to one of the first and second containers, flows from the entrance flow distribution chamber into the large diameter section of the material retention chamber. The individual particles of adsorption material adsorbs at least one element from the fluid mixtures at a rate substantially proportional to the rate of flow of the fluid mixture therethrough. The cross-sectional area of the smaller second diameter section and the length of the material retention chamber are selected to assure that substantially the entire element is removed from the fluid mixture before leaving the exit flow distribution chamber as a product fluid. An output conduit connects the exit distribution chamber to a storage container for retention of the product fluid. As the product fluid passes from the exit flow distribution chamber, a portion thereof, which forms a purge fluid, is diverted from the output conduit into the exit flow distribution chamber in the other of the first and second containers. The purge fluid is directed by this exit flow distribution chamber into the small second diameter of material retention chamber in this container. The purge fluid expands as it flows through this material retention chamber and desorbs any of the element from the particles of adsorption material. The purge fluid and desorbed element pass into the entrance flow distribution chamber before entering a relief conduit connected thereto. The relief conduit is wound around the supply conduit and acts as a heat exchanger to condition the fluid mixture in the supply conduit by increasing the temperature thereof. The purge fluid and element flow out of the relief conduit and is directed by an insulating shroud to provide an external heat source for maintaining the first and second containers within a predetermined temperature range. After a preset time or when a predetermined pressure resistance is created in the bed of adsorption material in the first container, the pressurized fluid mixture is presented to the other of the first and second container and the production of the product fluid initiated therein while the bed of adsorption material in the one of the first and second containers is regenerated by a purge fluid.

It is the object of this invention to provide a fluid separator system with a container for retaining a fixed quantity of adsorption material wherein each particle of adsorption material adsorbs substantially the same amount of an element per unit of flow from a fluid mixture during an operational time period.

It is another object of this invention to provide a molecular sieve system with a container for holding a fixed quantity of adsorption material. The container has a larger entrance cross section than an exit cross section to match velocity of resulting output fluid product with an input fixed mixture to compensate for an element from the fluid mixture that is adsorbed and desorbed by the adsorption material.

It is another object of this invention to provide a molecular sieve system with a heater arrangement to maintain a bed of adsorption material within a predetermined temperature range irrespective of the temperature of the surrounding environment.

These and other objects should be apparent from reading this specification and viewing the drawings.

DETAILED DESCRIPTION OF THE INVENTION

Figure 1:
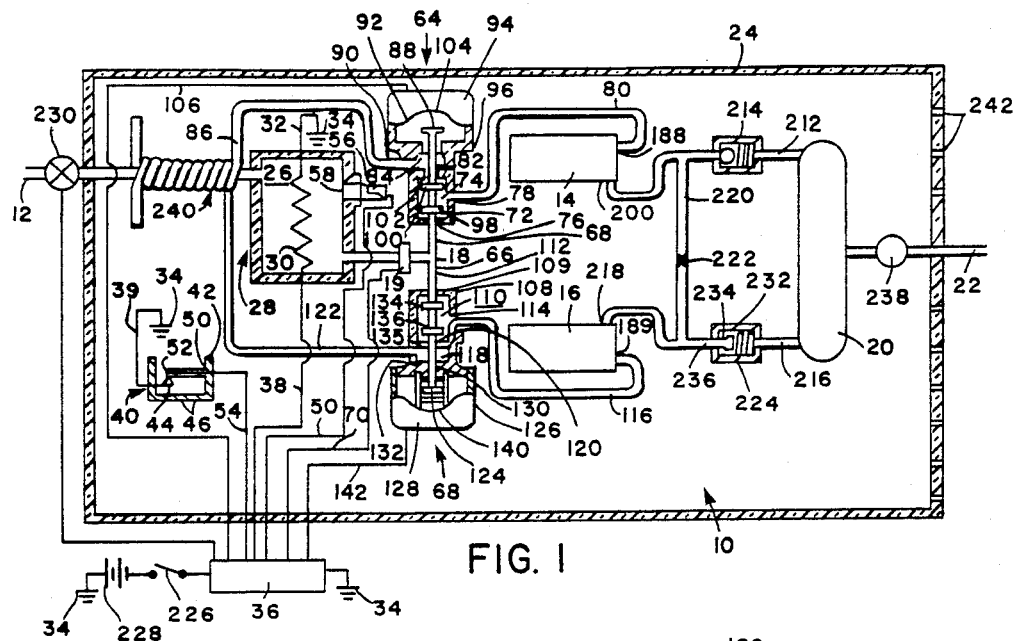
FIG. 1 is a schematic illustration of a molecular sieve separator system made according to the principles of this invention.

The molecular sieve separator system 10 shown in FIG. 1 has control valves 64 and 68 connected to a source of pressurized air or other fluid mixture through a supply conduit 12. Control valves 64 and 68 are sequentially activated to supply first and second containers 14 and 16, respectively, each of which contain an adsorption material, with pressurized air. The adsorption material in containers 14 and 16 adsorbs at least one element (nitrogen) from the pressurized air to produce a product effluent (oxygen enriched air). The product effluent is transmitted to a storage container 20 for use by a recipient as needed.

A portion of the product effluent produced in the first and second containers 14 and 16 is diverted from being communicated to the storage container 20 and is communicated as a purge fluid to the container 14 or 16 not receiving the pressurized air. The purge fluid enters the container at a low pressure to desorb any of the element contained therein from the adsorption material. Thereafter, the purge fluid and desorbed element flow to the surrounding environment as an exhaust fluid. A shroud 24 which surrounds the molecular sieve separator system 10 directs the exhaust fluid over the first and second containers 14 and 16 to maintain the temperature thereof within a predetermined range irrespectively of the temperature of the surrounding environment.

In more particular detail, the supply conduit 12 is connected to a chamber 26 of a heater member 28. An electrical resistance coil 30 in chamber 26 is connected by lead 32 to ground 34 and to a terminal of an electronic control 36 by lead 38.

A temperature sensor 56 in chamber 26 has a tip 58 which extends through housing 28 to continually sense the temperature of the fluid mixture in chamber 26. A signal representative of the temperature in chamber 26 is carried through lead 50 to the electronic control 36. Whenever the temperature in chamber 26 reaches a preset temperature, the communication of electrical energy from the electronic control 36 through lead 38 is interrupted and resistance coil 30 rendered inoperative.

In addition, a temperature controller or thermostat 40 located within shroud 24 is connected to a solenoid operated bleed valve 19 through the electronic controller 36. The temperature controller or thermostat 40 senses the temperature within the shroud 24 and supplies the electronic controller 36 with a temperature signal whenever the temperature within the shroud 24 falls below a predetermined value. The temperature signal is processed by the electronic controller 36 which thereafter supplies the solenoid operated bleed valve 19 with an electrical signal through lead 70. Activation of solenoid operated bleed valve 19 proportionally allows pressurized air which has been heated in chamber 26 of the heater member 28 to enter the shroud 24 and maintains the temperature therein within a predetermined temperature irrespectively of the temperature of the environment surrounding the shroud 24.

In more particular detail, the temperature controller or thermostat 40 has a bi-metal strip 48 one end of which is fixed to a housing 42 to position the other end 52 over terminal 44 connected to ground 34 by lead 39. The housing 42 has a series of openings 46 therethrough which permits air within the shroud to pass, without substantial interference, into contact with the bi-metal strip 48. The bi-metal strip 48 responds to the temperature of the air and at a preset temperature deflects to form a bridge between terminals 44 and 50 and close an electrical circuit between ground 34 and the electronic controller 36 through leads 39 and 54. The closure of this electric circuit is the temperature signal that operates the electronic controller 36 to activate the solenoid bleed valve 19 and allow warm pressurized air to enter the shroud 24.

The pressurized fluid mixture or air flows from chamber 26 at a minimum temperature controlled by sensor 56 to tee connection 18 for distribution along branch conduit 62 to the first control valve 64 or along branch conduit 66 to the second control valve 68. The control valves 64 and 68 respond to an electrical signal from electronic control 36 to select the flow path for the pressurized fluid mixture to either the first container 14 or second container 16.

Control valve 64 has a housing 72 with a control chamber 74 located therein. A first port 76 connects the control chamber 74 with branch conduit 62 going to tee 18 while a second port 78 connects the control chamber 74 with conduit 80 going to the first container 14. A wall 82 separates the control chamber 74 from an atmospheric chamber 84. A conduit 86 which connects the atmospheric chamber 84 to the surrounding environment, could be spirally wound around a portion of the supply conduit 12, as shown in FIG. 1, to impart a thermal reaction through conductance to the pressurized fluid mixture or air flowing in the supply conduit 12 or merely communicated to the interior of the shroud 24.

A plunger 88 located in coil 92 of solenoid 94 has a stem 90 that extends through guide or bearing wall 96 into the control chamber 74. A first poppet 98 attached to the stem 90 is located adjacent the first port 76 while a second poppet 100 attached to the stem 90 is located adjacent an opening 102 that connects the control chamber 74 with atmospheric chamber 84. A spring 104 acts on the plunger 88 and urges the first poppet 98 toward a seat to prevent fluid communication between the branch conduit 62 and the control chamber 74 whenever coil 92 is deactivated. The deactivation of coil 92 is controlled by an electrical signal communicated through lead 106 from electronic control 36.

Similarly, control valve 68 has a housing 108 with a control chamber 110 located therein. Control chamber 110 has a first port 112 connected to branch conduit 66 and a second port 114 for connecting the control chamber 110 with conduit 116 going to the second container 16. Control chamber 110 is separated from an atmospheric chamber 118 by a wall 120. A conduit 122 which connects the atmospheric chamber 118 to the surrounding environment can also be spirally wound around a portion of the supply conduit 12 to impart a thermal reaction through conductance with the pressurized fluid mixture or air flowing in the supply conduit 12.

A plunger 124 located in coil 126 of a solenoid 128 has a stem 130 that extends through a guide or bearing wall 132 into the control chamber 110. A first poppet 134 attached to the stem 130 is located adjacent the first port 112 while a second poppet 136 attached to the stem is located adjacent opening 138 that connects the control chamber 110 with the atmospheric chamber 118. A spring 140 acts on plunger 124 and urges the first poppet 134 towrd a seat to prevent communication between branch conduit 66 and the control chamber 110 whenever coil 126 is deactivated. Deactivation of coil 126 is controlled by an electrical signal transmitted from electronic controller 36 through lead 142.

Figure 2:
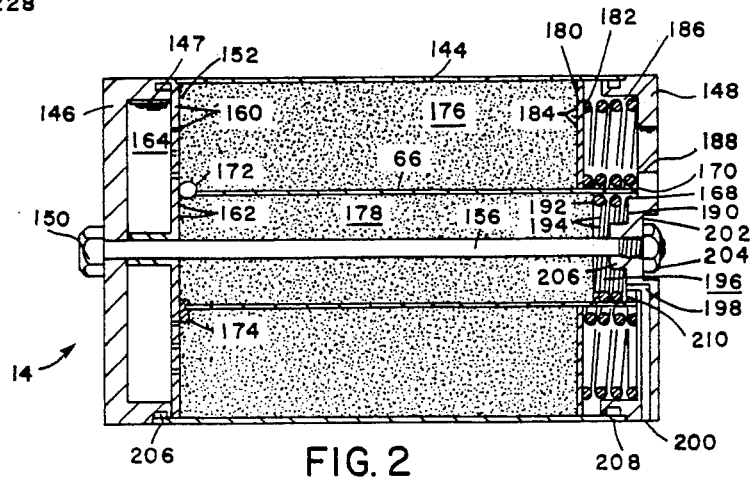
FIG. 2 is a sectional view taken along lines 2—2 of FIG. 1 showing a container having interconnected first and second beds for holding a fixed quantity of adsorption material.

The first and second containers 14 and 16 are identical and therefore only the first container 14 is described in detail on FIG. 2.

The first container 14 has a cylindrical housing 144 with first and second end caps 146 and 148 connected thereto by fastener member 150 to establish a sealed container 14. A shoulder 158 holds the disc or plate 142 away from end cap 146 to establish a chamber 164. A plurality of openings 160 and 162 located therein to allow substantially free communication therethrough to chamber 164. The first disc or plate 152 and end plate 146 cooperate with housing 144 to define the flow chamber 164 adjacent end 146. A sleeve or tubular member 166 has a first end 170 positioned on rib 168 on the second end cap 148 and a second end 172 with a seal 174 located thereon which engages disc 152 to establish chambers 176 and 178 in container 14.

A second disc or plate 180 which surrounds tubular member 166 cooperates with the cylindrical housing 144, the first disc 152, and tubular member 166 to define the limits of chamber 176. A spring 182 located between end cap 148 and second disc 180 urges the second disc 180 toward the first disc 152 for retaining a fixed quantity of adsorption material located in chamber 176 at substantially the same density during both adsorption and desorption in a cycle of operation. The second disc 180 has a plurality of openings 184 located therein to provide a plurality of flow paths between flow distribution chamber 186 and chamber 176. An entrance port 188 connects the end cap 148 with conduit 80 coming from the control valve 64.

A third disc 190 aligned on bolt 156 of the fastener member 150 is located in the tubular member 166. A spring 192 located between shoulder 168 on the end cap 148 urges the third disc 190 toward the first disc 152 to define the size of chamber 178. Spring 192 provides a constant force on the quantity of adsorption material located in chamber 178 to substantially match the density of the adsorption material in chamber 176. The third disc 190 has a plurality of openings 194 therethrough to provide substantially unrestricted flow communication between chamber 178 and flow chamber 196 located adjacent passage 198 of port 200 in end cap 148.

In addition, the second end cap 148 has an annular depression or groove 202 located thereon. Bolt 156 which projects through opening 206 in the second end cap 148 extends into the depression or groove 202. A nut 204 attached to bolt 156 is protected from damage by being located in the groove or depression 202. When nut 204 and bolt 156 are torqued to a preset tension, seals 174, 207, 208, and 210 are seated to provide a sealed container 14.

Port 200 on container 14 is connected to storage container 20 through product conduit 212. A check valve 214 in conduit 212 prevents the flow of fluid from the storage container 20 back into container 14. However, product conduit 212 is connected by an intermediate conduit 220 to product conduit 216 connecting port 218 of container 16 with storage container 20. A restriction 222 in the intermediate conduit 220 limits the amount of product fluid that flows through the intermediate conduit 220. Similarly, a check valve 224 located in product conduit 216 prevents the flow of the product fluid from storage container 20 back into container 16.

MODE OF OPERATION OF THE INVENTION

Before an aircraft equipped with a fluid separator system 10 shown in FIG. 1 takes off from an air field, electrical switch 226 is switched ON to allow electrical energy to flow from source 228 to the electronic control 36. Thereafter, the electronic control 36 simultaneously transmits electrical signals to a pressurized supply control valve 230, and one of the control valves 64 and 68.

The electrical signal opens the pressurized fluid supply control valve 230 and allows pressurized fluid mixture to air to flow in supply conduit 12. As long as the temperature of the fluid downstream of heater 28 as measured by probe 58 is above 80° F. or some other preselected temperature, electrical coil 30 in heater 28 remains in the OFF state. However, whenever the pressurized fluid temperature downstream of the heater 28 as measured by probe 58 is below 80° F. or some other preselected temperature, the coil 30 receives electrical current from the controller 36 to heat the fluid mixture in chamber 26. In addition, if the temperature within shroud 24 as measured by thermostat 40 is below 80° F. or some other preselected temperature, end 52 of the bi-metal strip 48 engages terminal 44 and forms a bridge between terminals 50 and 44 to allow electrical current to flow to ground 34 through lead 39. Thereafter electronic controller 36 transmits an electrical signal to bleed valve 19 and allows heated pressurized air to flow into shroud 24 to raise the temperature therein. Thus, through the temperature sensor 56 and thermostat 40, the pressurized fluid mixture or air in the supply conduit 12 and the temperature within shroud 24 is maintained at about 80° F. or some other preselected temperature.

As shown in FIG. 1, the pressurized fluid mixture or air flows through tee 18 to control valve 68. The coil 126 is solenoid 128 is activated through an electrical signal transmitted through lead 142 from electronic control 36. When activated, coil 126 attempts to position plunger 124 at the center of the coil 126 in opposition to spring 140. Movement of plunger 124 moves poppet 134 away from port 112 to seat poppet 136 on seat 138 and seal the atmospheric chamber 118 from the control chamber 110. The pressurized fluid mixture or air flows through the control valve 68 and is communicated by conduit 116 to port 189 in container 16.

As stated in the detailed description of container 14, the pressurized fluid mixture or air enters a flow distribution chamber 186 and is uniformly distributed to the disc or plate 180 for communication to the adsorption material in chamber 176. The pressurized fluid mixture flows through openings 184 into engagement with the individual particles of adsorption material where at least one component (nitrogen) is retained by adsorption. As the pressurized fluid mixture passes through chamber 176 more and more of the element (nitrogen) is removed from the fluid mixture (air). However, upon passing into the intermediate flow chamber 164 a small percentage of the element is still in the resulting fluid mixture. Therefore, in order to remove the remaining percentage it is necessary to provide a long flow path where the opportunity is present for the element to contact a particle of the adsorption material is increased. Thus, the intermediate fluid mixture passes from the intermediate flow distribution chamber 164 through openings 162 and into chamber 178 where any remaining element is removed before the resultant product fluid (oxygen enriched breathable fluid) passes into flow distribution chamber 196 for distribution to storage container 20 by conduit 216. The pressure of the product fluid emerging from chamber 196 overcomes spring 232 in check valve 224 to move ball 234 off seat 236 before passing into storage container 20. The fluid product (oxygen enriched breathable fluid) passes through a pressure regulator 238 in conduit 22 before being communicated to a recipient.

As the fluid product flows in conduit 216 from container 16, a purge portion is bled off through intermediate conduit 220 by passing through restriction 222. This purge portion of the fluid product enters port 200 in container 14 and is uniformly distributed through flow chamber 196 to disc or plate 190.

During this mode in a cycle of operations, solenoid 94 is inoperative and spring 104 moves plunger 90 to seat poppet 98 and prevent communication through conduit 62 while allowing communication to the atmosphere or surrounding environment from control chamber 74 through atmosphere chamber 84 to bring chamber 176 and 178 into communication with the atmosphere. When the purge portion of the fluid product passes through restriction 222 an expansion occurs. This expanded purge fluid enters chamber 178 and is brought into contact with substantially each particle is adsorption material to assure complete desorption of the element from chamber 178. The desorbed element and purge product fluid which pass through the intermediate chamber 164 is uniformly distributed through openings 160 to chamber 176 and upon entry into chamber 176, a further expansion occurs. Thereafter, this further expanded purge portion of the product fluid is brought into contact with substantially every particle of adsorption material in chamber 176. By the time the purge portion of the fluid product reaches chamber 186, substantially the entire element is desorbed from the adsorption material in chamber 176. By the time the purge portion of the fluid product reaches chamber 186, the substantially entire element is desorbed from the adsorption material in chamber 14.

The purge portion of the fluid product and element contained therein passes through port 188 for distribution to the surrounding environment through conduit 86 after passing through control valve 64. As the purge portion of the fluid product and element flow in conduit 86, a thermal reaction is imparted to the supply conduit 12 in the heat exchange section 240 to condition the pressurized fluid mixture flowing therein and reduce the amount of input heat required from the heater 28.

Upon exiting from conduit 86, the purge portion of the fluid product and element contained therein is directed by shroud 24 to flow around the separator exchange components before being communicated to the surrounding environment through openings 242. Thus, the components in the separator system are maintained at substantially the same temperature during a cycle of operation regardless of the temperature of the surrounding environment.

After a predetermined period, electronic control 36 deactivates coil 126 of solenoid 128 in control valve 68 and spring 140 seats poppet 134 on the seat 109 of port 112 to interrupt communication between control chamber 110 and branch conduit 66. Thereafter, electronic control 36 supplies coil 92 of solenoid 94 in control valve 64 with an electrical energy through lead 106. The electrical energy supplied to coil 92 creates a magnetic field that moves plunger 88 in opposition to spring 104 and urges poppet 100 onto seat 102 to open communication to control chamber 74 with branch conduit 62. Thereafter, the temperature controlled pressurized fluid flows through control valve 64 to container 14 where the fluid product (oxygen enriched breathable fluid) is produced and communicated to storage container 20 while a portion thereof is diverted through conduit 220 to purge the element from the particles in container 16.

In order to evaluate the effectiveness of the insulated shroud 24, the performance of a separator system 10 without a shroud 24 was operated under the following conditions.

Figure 4:
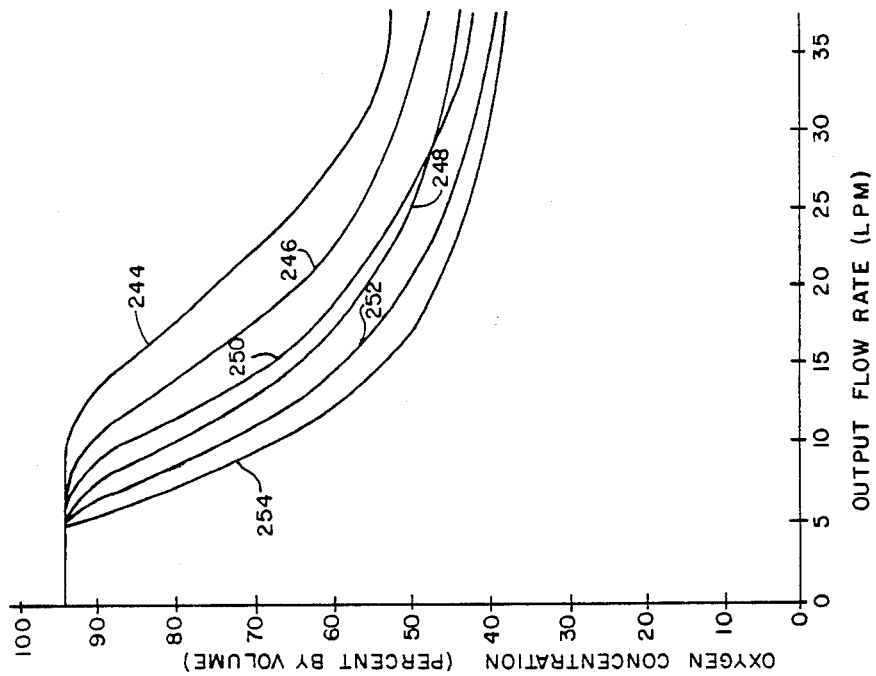
FIG. 4 is a graph showing the adsorption efficiency of a molecular sieve separator with changes in temperature of the surrounding environment.

The pressurized fluid mixture or air was sequentially presented to the beds of material in containers 14 and 10 by control valve 64 and 68 at 80° F. and 40 psig. The surrounding environment temperature was maintained at 80° F. during the production of a fluid product having an oxygen concentration at the various flow rates illustrated by curve 244 in FIG. 4. Thereafter, the separator system 10 was presented with pressurized air or fluid mixture at 75° F. and 40 psig while the surrounding environment temperature was maintained at 50° F. during a second evaluation, and at 30° F. during a third evaluation to produce projected output curves 246 and 248, respectively, in FIG. 4.

To confirm the results of this first evaluation, a second series of tests were made at these same temperatures while the pressure of the fluid mixture reduced to 25 psig. When the separator system 10 was operated with the temperature of the pressurized fluid mixture or air and surrounding environment at 80° F. the projected output is illustrated by curve 250 in FIG. 4. Later, when the inlet temperature of the pressurized fluid mixture was maintained at 75° F. and the surrounding environment temperature reduced to 50° F. and 30° F., projected product output curves 252 and 254 illustrated in FIG. 4 were produced.

These tests clearly illustrate a need for maintaining the temperature of both the pressurized fluid mixture and the beds of adsorption material at about 80° F. in order to optimize the separation of oxygen from air by the molecular sieve separator system 10.

Figure 5:
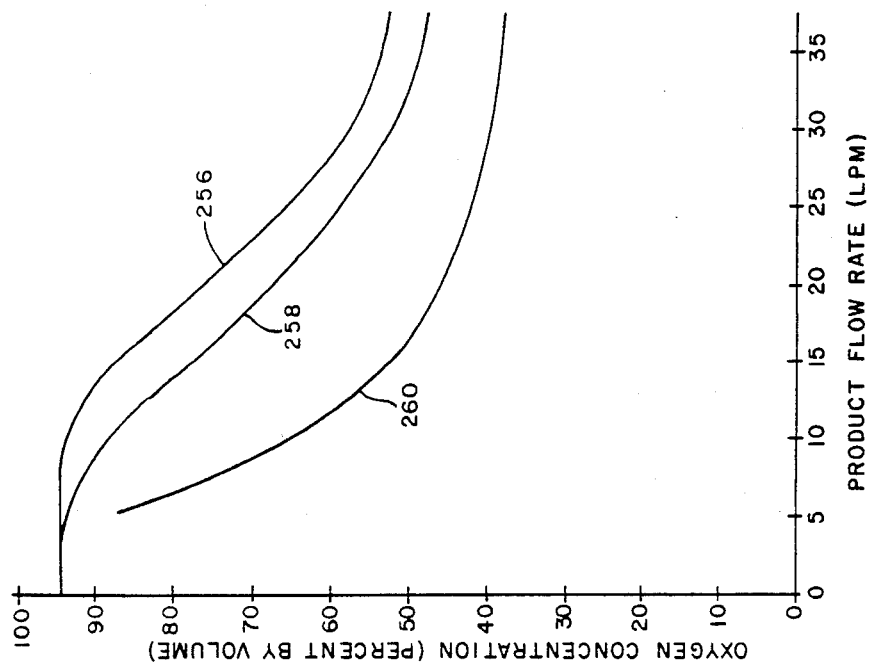
FIG. 5 is a graph showing the operation of a molecular sieve separator with a temperature control for maintaining the separator at a substantially uniform temperature irrespective of the temperature of the surrounding environment.

Thereafter, further tests were made with the separator system 10 illustrated in FIG. 1 with the shroud 24 of insulated material covering the beds 14 and 16 with the heater member 28 and bleed valve 19 in operation. The temperature of the fluid mixture as presented to the beds of material in containers 14 and 16 and the surrounding environment was maintained at about 80° F. and at 40 psig. The production of oxygen enriched product fluid that was achieved is illustrated by curve 256 in FIG. 5.

Thereafter, the temperature of the surrounding environment was reduced to a temperature of about −65° F. At this temperature, the thermostat or temperature control 40 and temperature sensor 56 are operational. A certain amount of the fluid mixture preheated to 80° F. was bled off through solenoid valve 19 to maintain the area within the shroud at approximately 80° F. However, the production of the oxygen enriched breathable fluid that was produced is illustrated by curve 258 in FIG. 5.

Thereafter, the temperature sensor 56 and thermostat or temperature control 40 were deactivated and the temperature of the surrounding environment was maintained at 0° F. The production of the oxygen enriched product fluid that was produced is illustrated by curve 260 in FIG. 5.

Thus, it should be apparent from these tests that a most effective molecular sieve separator is produced by a container where substantially every particle of adsorption material is brought into contact with the fluid mixture through a variable area bed of adsorption material and the temperature of the system is maintained at about 80° F.

Figure 3:
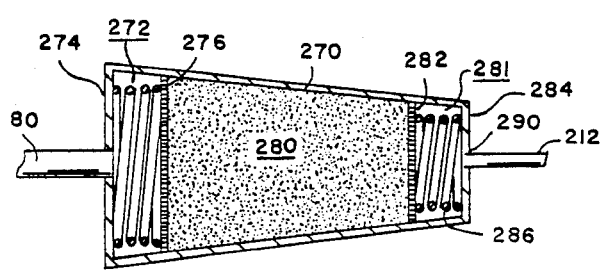
FIG. 3 is a section view of a secondary variable area container for retaining the adsorption material of a molecular sieve separator system.

Upon evaluating the operation of molecular sieve separators having a change in area of the bed of adsorption material between the entrance and exit port of a container, such as the stepped variation in the area shown in FIG. 2. It is surmised that the optimum bed configuration should have a cross-sectional area that decreases from inlet to outlet, such as container 270 in FIG. 3. The container 270 has a conical shape with a first flow chamber 272 located between the end cap 274 and the filter or disc 276. The filter or disc 276 allows uniform distribution of the fluid mixture from conduit 80 to the bed of adsorption material retained in chamber 280. A second disc or filter 282 is located between end cap 284 and chamber 280 to establish a second flow through chamber 281. For some applications a spring 286 may be provided to exert a constant force on disc 282 to maintain a substantially uniform density in the bed of adsorption material during purge flow conditions. It is anticipated that the operational separation of the element from the fluid mixture would be uniform since the conical container 270 is designed to compensate for any decrease in flow of the fluid mixture resulting from adsorption of the element by the material.

I claim:

1. A material separator system comprising:
    a first container having a first separator chamber connected to a second separator chamber, said first and second separator chambers each holding a quantity of adsorption material in particle form to create a first bed, said first and second chambers each having a cross-sectional area that varies linearly with distance to compensate for changes in the flow of the fluid from the first chamber to the second chamber caused by retention of a component in the fluid mixture by the particles contained in the first bed;
    a second container having a third separator chamber connected to a fourth separator chamber, said third and fourth separator chambers each holding a quantity of adsorption material in particle form to create a second bed, said third and fourth chambers each having a cross sectional area that varies linearly with distance to compensate for changes in the flow of fluid from the third chamber to the fourth chamber caused by retention of a component in the fluid mixture by the particles contained in the second bed;
    supply conduit means for connecting a source of pressurized fluid mixture to said first and third chambers;
    an outlet conduit having a first branch connected to said second chamber and a storage container, and a second branch connected to said fourth chamber and the storage chamber;
    an intermediate conduit for connecting said first branch to said second branch;
    a restrictive member located in said intermediate conduit to limit the flow communication between the first and second branches;
    valve means connected to said supply conduit for sequentially controlling the communication of said source of fluid mixture to one of said first and second containers where an element in the fluid mixture is adsorbed in the particles to produce a product fluid as the fluid mixture flows from the first chamber toward the second chamber and from the third chamber toward the fourth chamber, respectively, said varying of the cross sectional area providing substantially uniform adsorption throughout the entire first and second beds as the fluid mixture flows therethrough, said product fluid flow through the outlet conduit while a portion thereof flows through the intermediate conduit to purge the element from the particles in the other of said first and second containers by flowing from the second chamber toward the first chamber and the fourth chamber toward the third chamber, respectively;
    heater means associated with said supply conduit means for maintaining said pressurized fluid mixture within a predetermined temperature range;
    shroud means for insulating at least said heater means, supply conduit, said valve means, and said first and second containers from the surrounding environment;
    first sensor means connected to said heater means for monitoring the temperature of said pressurized fluid mixture in said supply conduit to establish a first operational temperature signal;
    second sensor means located in said shroud for measuring the temperature therein to establish a second operational temperature signal;
    bleed valve means connected to said supply conduit; and
    electronic control means for supplying said first and second valve means with an operational signal to sequentially transfer the supply of fluid mixture from the first container to the second container after a predetermined time period, said electronic control means being connected to said first and second sensor means for supplying said heater means with a first operational input in response to said first temperature signal below a predetermined value and for supplying said bleed valve means with a second operational input to allow a portion of the fluid mixture in said supply conduit to flow into the shroud means and maintain the temperature therein within said predetermined temperature range in order that optimum adsorption of the element occurs in the first and second containers with the presentation of the fluid mixture thereto.

2. The material separator system as recited in claim 1 wherein said first and second separator chambers and said third and fourth separator chambers are separated by intermediate first and second flow distribution chambers, respectively, to reduce the possibility of the creation of fixed flow paths through the particles caused by the flow of the pressurized fluid mixture and the purge fluid therethrough.

3. The material separator system as recited in claim 2 further including:

exhaust conduit means connected to said valve means and surrounding a portion of said supply conduit to warm the fluid mixture prior to being presented to said heater means.

4. The material separator system as recited in claim 1 wherein said first and second containers each include:

a first cylindrical member having a first end and a second end, a first end cap attached to said first end of said cylindrical member;

a first plate associated with said first cylindrical member to establish an intermediate flow chamber adjacent said first end cap, said first plate having a series of openings therein to allow fluid communication therethrough;

a second cylindrical member located inside said first cylindrical member and engaging said first plate to establish entrance and exit separator chambers, said entrance and exit separator chambers being connected to each other through said intermediate flow chamber, said entrance and exit separator chambers each retaining a fixed quantity of adsorption material in particle form;

a second plate surrounding said second cylindrical member for retaining the particles of adsorption material in the entrance separator chamber, said second plate having a second series of openings therein to allow fluid communication therethrough;

a third plate located in said second cylindrical member for retaining the particles of adsorption material in the exit separator chamber, said third plate having a series of openings therein to allow fluid communication therethrough; and a second end cap attached to said second end of said first cylindrical member and engaging said second cylindrical member to establish first and second flow chambers adjacent said entrance and exit separator chambers, respectively, said second end cap having a first port connected to said supply conduit, said first flow chamber and a second port connected to said second flow chamber and said outlet conduit, said element in the fluid mixture being sequentially adsorbed by the particles in the first and second separator chambers to produce said product fluid, said intermediate flow chamber directing the flow between the entrance and exit chambers to reduce the possibility of set flow paths being established therebetween.

5. The material separator system as recited in claim 4 including:

an entrance resilient member connected to said second end cap for urging the particles of adsorption material toward said first plate to maintain substantially the same density in the particles in the first separator chamber during adsorption and purging.

6. The material separator system as recited in claim 5 further including:

an exit resilient member connected to said second end cap for urging the particles of adsorption material toward said first plate to maintain substantially the same density in the particles in the second separator chamber during adsorption and purging.

7. The material separator system, as recited in claim 1 wherein said temperature of the fluid mixture supplied to said first and second container is maintained between 75°–85° F. to provide for optimum adsorption in the first and second beds and to permit the product fluid in the storage chamber to be directly supplied to a recipient.

8. The material separator system as recited in claim 1 wherein said first and second separator chambers and said third and fourth separator chambers are separated by intermediate first and second flow distribution chambers, respectively, to reduce the possibility of the creation of fixed flow paths through the particles caused by the flow of the pressurized fluid mixture and the purge fluid therethrough.

9. The material separator system as recited in claim 8 further including:

exhaust conduit means connected to said valve means and surrounding a portion of said supply conduit to warm the fluid mixture prior to being presented to said heater means.

* * * * *